United States Patent Office 3,239,525
Patented Mar. 8, 1966

3,239,525
DIALKYLAMINOALKYL ESTERS OF 3-PHENYL-CINNOLINE-4-CARBOXYLIC ACIDS
Harman S. Lowrie, Glenview, Ill., assignor to G. D. Searle & Co., Chicago, Ill., a corporation of Delaware
No Drawing. Filed July 13, 1964, Ser. No. 382,355
4 Claims. (Cl. 260—250)

The present invention relates to a group of compounds which are aminoalkyl esters of 3-phenylcinnoline-4-carboxylic acids. In particular, it relates to a group of compounds having the following general formula

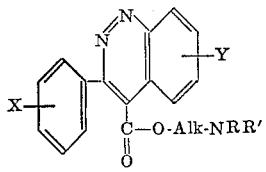

wherein Alk is a lower alkylene radical separating the nitrogens attached thereto by at least 2 carbon atoms; —NRR' is selected from the group consisting of di(lower alkyl)amino, 4-methyl-1-piperazinyl, 1-pyrrolidinyl, piperidino, and morpholino; X and Y are each selected from the group consisting of hydrogen, halogen, methyl, and methoxy.

The lower alkylene radicals referred to above contain up to 6 carbon atoms and can be exemplified by radicals such as ethylene, propylene, trimethylene, and tetramethylene. The lower alkyl radicals referred to above likewise contain up to 6 carbon atoms and can be exemplified by radicals such as methyl, ethyl, propyl, isopropyl, and butyl. The halogens referred to above include fluorine, chlorine, bromine, and iodine.

The organic bases of this invention form nontoxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of the present invention can be readily prepared from carboxylic acids of the formula

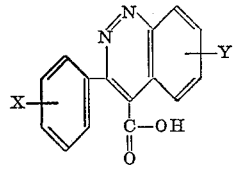

wherein X and Y are defined as above. Such an acid is readily converted to the corresponding acid halide. For example, thionyl chloride reacts with the acid to give the corresponding acid chloride. The acid chloride is then reacted with an appropriate amino alcohol to give the compounds of the present invention.

The compounds of the present invention are useful because of their pharmacological properties. Thus, they possess hypotensive activity and anti-inflammatory activity. The latter activity is demonstrated by their phenylbutazone-like effect on edematous conditions. In addition, the present compounds possess anti-biotic activity against a variety of organisms. Thus, they inhibit the growth of bacteria such as *Diplococcus pneumoniae* and protozoa such as *Tetrahymena gelleii*. In addition, they inhibit germination of seeds of Trifolium.

The following examples are presented to further illustrate the present invention; they should not be construed as limiting it in spirit or in scope. In these examples, quantities are indicated in parts by weight and temperatures in degrees centigrade (° C.).

*Example 1*

A solution of 5.4 parts of crude 3-phenyl-cinnoline-4-carbonyl chloride in 67 parts of methylene chloride is added portionwise to a mixture of 3 parts of 3-dimethylamino-1-propanol and 3 parts of pyridine in 200 parts of methylene chloride. The reaction mixture warms slightly from the heat of reaction and it is allowed to stand at room temperature for 15 hours. The resultant mixture is then diluted with methylene chloride, washed with dilute potassium carbonate solution, and dried, and the solvent evaporated under reduced pressure. The residue is suspended in ether and the ether mixture is extracted with dilute hydrochloric acid. The acid extract is made alkaline and then extracted with methylene chloride. The methylene chloride solution is dried and the solvent evaporated. The residual oil (4.8 parts) is dissolved in 30 parts of hot acetone with 2.3 parts of maleic acid. When the resultant solution is cooled yellow prisms form. These are filtered off and dried to give the maleic acid salt of 3-dimethylaminopropyl 3-phenylcinnoline-4-carboxylate melting at about 153–155° C. The free base of this compound has the following formula

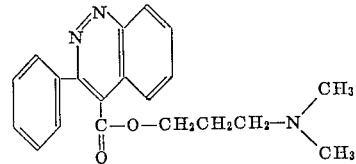

*Example 2*

An equivalent quantity of 3-diethylamino-1-propanol is substituted for the 3-dimethylamino-1-propanol and the procedure described in Example 1 is repeated. In this way, there is obtained the maleic acid salt of 3-diethylaminopropyl 3-phenylcinnoline-4-carboxylate.

*Example 3*

A solution of 5.4 parts of 3-phenylcinnoline-4-carbonyl chloride in 130 parts of methylene chloride is added to a solution of 5.8 parts of 2-(4-methyl-1-piperazinyl) ethanol in 130 parts of methylene chloride. The resultant mixture is allowed to stand for 15 hours before it is further diluted with methylene chloride and then washed with dilute potassium hydroxide solution. The methylene chloride solution is then extracted with dilute hydrochloric acid and the acid extract is made alkaline and then extracted with methylene chloride. The resulting methylene chloride solution is dried and the solvent is evaporated under reduced pressure. The residue (4 parts) is dissolved in 60 parts of hot ethanol and mixed with 2.6 parts of maleic acid. The ethanol solution is cooled to give a yellow powder which is filtered and dried. The product thus obtained is 2-(4-methyl-1-piperazinyl)ethyl 3-phenylcinnoline-4-carboxylate as the salt with two moles of maleic acid. This product melts at about 150–151° C. The free base has the following formula

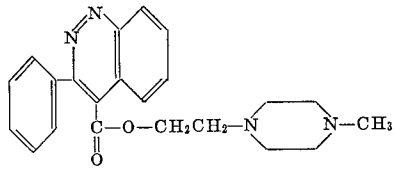

*Example 4*

An equivalent quantity of 2-piperidinoethanol is substituted for the 3-dimethylamino-1-propanol and the procedure described in Example 1 is repeated. The product thus obtained is the maleic acid salt of 2-piperidinoethyl 3-phenylcinnoline-4-carboxylate.

Example 5

2-morpholinoethanol is reacted with 3-(4-chlorophenyl)cinnoline-4-carbonyl chloride according to the procedure described in Example 1. The product obtained in this way is 2-morpholinoethyl 3(4-chlorophenyl)cinnoline-4-carboxylate as the salt with maleic acid. The free base of this compound has the following formula

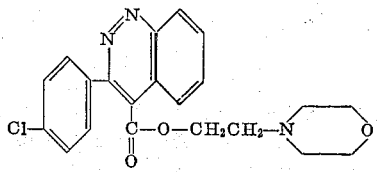

What is claimed is:
1. A compound of the formula

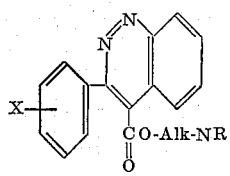

wherein Alk is lower alkylene separating the nitrogens attached thereto by at least 2 carbon atoms; —NRR' is selected from the group consisting of di(lower alkyl)-amino, piperidino, morpholino, and 4-methyl-1-piperazinyl; X is selected from the group consisting of hydrogen and chlorine.

2. A compound of the formula

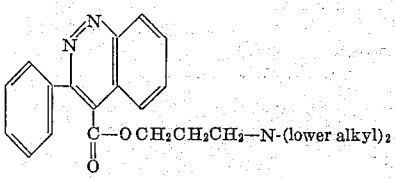

3. 3 - dimethylaminopropyl 3 - phenylcinnoline-4-carboxylate.

4. 2-(4-methyl-1-piperazinyl)ethyl 3-phenylcinnoline-4-carboxylate.

No references cited.

IRVING MARCUS, *Primary Examiner.*